US011285681B2

(12) United States Patent
Fahy

(10) Patent No.: US 11,285,681 B2
(45) Date of Patent: Mar. 29, 2022

(54) METHOD AND APPARATUS FOR FORMING A LENS

(71) Applicant: Bausch & Lomb Incorporated, Rochester, NY (US)

(72) Inventor: Kevin J. Fahy, County Waterford (IE)

(73) Assignee: Bausch & Lomb Incorporated, Rochester, NY (US)

( * ) Notice: Subject to any disclaimer, the term of this patent is extended or adjusted under 35 U.S.C. 154(b) by 208 days.

(21) Appl. No.: 15/720,711

(22) Filed: Sep. 29, 2017

(65) Prior Publication Data

US 2018/0093435 A1  Apr. 5, 2018

Related U.S. Application Data

(60) Provisional application No. 62/402,970, filed on Sep. 30, 2016.

(51) Int. Cl.
*B29D 11/00* (2006.01)
*G02C 7/04* (2006.01)

(52) U.S. Cl.
CPC .. *B29D 11/00125* (2013.01); *B29D 11/00038* (2013.01); *B29D 11/0048* (2013.01); *B29D 11/00134* (2013.01); *G02C 7/047* (2013.01); *B29D 11/00509* (2013.01)

(58) Field of Classification Search
None
See application file for complete search history.

(56) References Cited

U.S. PATENT DOCUMENTS

| 4,859,261 A * | 8/1989 | Ace ............... B29D 11/00028 156/102 |
| 5,601,759 A * | 2/1997 | Apollonio ............ B29C 33/42 264/1.8 |
| 5,815,239 A | 9/1998 | Chapman et al. |
| 2002/0056801 A1 | 5/2002 | Dean |

(Continued)

FOREIGN PATENT DOCUMENTS

GN  1054336 C  7/2000

OTHER PUBLICATIONS

European Search Report from corresponding EP application No. 17857529.6 dated May 15, 2020.

(Continued)

*Primary Examiner* — Lisa L Herring
(74) *Attorney, Agent, or Firm* — Jodi A. Reynolds, Esq.; Timothy W. Menasco, Esq.; Harter Secrest & Emery LLP

(57) ABSTRACT

Exemplary embodiments of the present disclosure provide a method and apparatus for forming an ophthalmic lens. An exemplary method includes providing a plurality of posterior tools each having a posterior optic defining surface and a plurality of anterior tools each having an anterior optic defining surface, wherein each one of the plurality of posterior tools has a different central posterior optic defining surface including a unique conic section. The method further includes selecting one of the plurality of posterior tools and one of the plurality of anterior tools based on a criteria, and forming a posterior mold by the selected one of the plurality of posterior tools and an anterior mold by the selected one of the plurality of anterior tools, the posterior mold and the anterior mold operable to form an ophthalmic lens having the criteria.

7 Claims, 7 Drawing Sheets

(56) References Cited

U.S. PATENT DOCUMENTS

| | | | |
|---|---|---|---|
| 2006/0109421 A1 | 5/2006 | Ye et al. | |
| 2007/0146628 A1* | 6/2007 | Green | G02C 7/04 351/159.02 |
| 2009/0121370 A1 | 5/2009 | Barrows et al. | |
| 2009/0262301 A1* | 10/2009 | Zuba | G02C 7/04 351/159.38 |
| 2014/0035176 A1 | 6/2014 | Hamilton | |
| 2017/0368742 A1* | 12/2017 | Slep | B29C 64/112 |

OTHER PUBLICATIONS

International Search Report from PCT/US2017/54408 completed Nov. 16, 2017/dated Dec. 15, 2017.
Chinese Patent Office, First Office Action in corresponding CN Application No. 201780060478.5, dated Sep. 3, 2020.

\* cited by examiner

FIG. 3

| | | Posterior Steps | | | | |
|---|---|---|---|---|---|---|
| | | -1.00D | -0.75D | -0.50D | -0.25D | |
| | | PXXXXXM | PXXXXXM | PXXXXXM | PXXXXXM | |
| Anterior Tools | XXXXXX9 | -9.00 | -8.75 | -8.50 | -8.25 | |
| | XXXXXX8 | -8.00 | -7.75 | -7.50 | -7.25 | |
| | XXXXXX7 | -7.00 | -6.75 | -6.50 | -6.25 | |
| | XXXXXX6 | -6.00 | -5.75 | -5.50 | -5.25 | |

FIG. 4

| | Posterior Tools | | | | | | | |
|---|---|---|---|---|---|---|---|---|
| | PXXXXX2 | PXXXXX3 | PXXXXX4 | PXXXXX5 | PXXXXX6 | PXXXXX7 | PXXXXX8 | PXXXXX9 |
| | Step -- | Step -- | Step - | -1.00D | Step + | Step ++ | Step +++ | -0.75D |
| Anterior Tools | | | | | | | | |
| XXXXXX9 | -9.19 | -9.13 | -9.06 | -9.00 | -8.94 | -8.88 | -8.81 | -8.75 |
| XXXXXX8 | -8.19 | -8.13 | -8.06 | -8.00 | -7.94 | -7.88 | -7.81 | -7.75 |
| XXXXXX7 | -7.19 | -7.13 | -7.06 | -7.00 | -6.94 | -6.88 | -6.81 | -6.75 |
| XXXXXX6 | -6.19 | -6.13 | -6.06 | -6.00 | -5.94 | -5.88 | -5.81 | -5.75 |

| Anterior Tool Radius (mm) | Anterior Lens Radius (mm) | Anterior Tool Conic | Posterior Tool ID | Posterior Tool Radius (mm) | Posterior Lens Radius (mm) | Posterior Conic | Resultant Lens Power (D) | Resultant Spherical Aberration (μm's) |
|---|---|---|---|---|---|---|---|---|
| 5.3175 | 8.7097 | -0.20 | P-1.00D | 4.9898 | 8.1725 | 0.00 | -2.90 | -0.179 |
| | | | + | 4.9968 | 8.1839* | 0.00 | -2.84 | -0.176 |
| | | | ++ | 5.0038 | 8.1954 | 0.00 | -2.77 | -0.175 |
| | | | +++ | 5.0108 | 8.2068 | 0.00 | -2.71 | -0.173 |
| | | | - - | 4.9962 | 8.1829** | 0.014 | -2.85 | -0.186 |
| | | | - | 5.0032 | 8.1944 | 0.014 | -2.78 | -0.183 |
| | | | P-0.75 | 5.0102 | 8.2059 | 0.014 | -2.72 | -0.181 |
| | | | + | 5.0172 | 8.2173 | 0.014 | -2.65 | -0.179 |
| | | | ++ | 5.0242 | 8.2288 | 0.014 | -2.59 | -0.177 |
| | | | +++ | 5.0312 | 8.2403 | 0.014 | -2.52 | -0.175 |
| | | | | 5.0382 | 8.2517 | 0.014 | -2.44 | -0.172 |

FIG. 5

METHOD AND APPARATUS FOR FORMING A LENS

BACKGROUND OF THE INVENTION

Field of the Invention

Exemplary embodiments of the present disclosure relate to a method and apparatus for forming a lens. Exemplary embodiments of the present disclosure relate more particularly to forming an ophthalmic lens.

Description of Related Art

Contact lenses are generally cast molded by depositing a curable liquid into a mold cavity defined by two mold halves. The liquid is then cured within the mold cavity. Following the curing process the cured lenses are removed from the mold cavity. The lenses will then typically move through other post curing steps to produce a finished lens. The anterior mold half defines the anterior surface of the lens. The posterior mold half defines the posterior surface of the lens. Mold halves are traditionally used only once and then serve as an element of the packaging for the finished lenses or are discarded. In order to manufacture contact lens mold halves of a desired radius or power, posterior and anterior step tools are used to produce a batch of baseline molds. The baseline molds are measured for accuracy, and a series of step changes must then be made until the desired dimensions are achieved in the resulting mold halves.

The desired final lens product determines the design of the necessary posterior and anterior mold halves. More specifically, the final lens product design determines the portion of the mold that forms the optic surface. The desired mold determines the specific step tools. Conventional design procedures dictate that the desired base curve of the lens determines the design of the posterior mold. The desired optical characteristics of the lens typically determines the anterior design of the lens and the corresponding mold half. Accordingly, each lens that requires a different power, different curvature, or different optical characteristics will also require a different set of posterior and anterior mold halves. Due to the number of different factors considered in each lens design, the number of required posterior and anterior mold halves to accommodate each lens design can be significant.

For example, the hydrogel contact lens is usually available in power of 0.25 diopter increments. Each time a different power lens is produced, a corresponding anterior mold type is used. In this scenario, only one posterior mold type is used throughout the power range. A contact lens series having powers from −0.25 D to −5.00 D in 0.25 D increments has 20 different lens types. Accordingly, there is a need to reduce the number of required posterior and anterior molds to reduce costs and complexities associated with contact lens production.

BRIEF SUMMARY OF THE INVENTION

In view of the foregoing, it is an object of the present disclosure to provide a method and apparatus for forming an ophthalmic lens.

A first exemplary embodiment of the present disclosure provides a method of forming an ophthalmic lens. The method includes providing a plurality of posterior tools each having a posterior optic defining surface and a plurality of anterior tools each having an anterior optic defining surface, wherein each one of the plurality of posterior tools has a different central posterior optic defining surface including a unique conic section, and selecting one of the plurality of posterior tools and one of the plurality of anterior tools based on a criteria. The method further includes forming a posterior mold by the selected one of the plurality of posterior tools and an anterior mold by the selected one of the plurality of anterior tools, the posterior mold and the anterior mold operable to form an ophthalmic lens having the criteria.

A second exemplary embodiment of the present disclosure provides an apparatus for forming an ophthalmic lens. The apparatus includes a plurality of posterior tools having a posterior optic defining surface, wherein each one of the plurality of posterior tools has a different central posterior lens-molding surface including a unique conic section and is operable to form a posterior mold, and wherein each one of the plurality of posterior tools is operable to form a posterior mold. The apparatus further includes a plurality of anterior tools having an anterior optic defining surface, wherein each one of the plurality of anterior tools is operable to form an anterior mold, and wherein each one of the plurality of posterior tools is operable to form an anterior mold, and a forming element that mates a selected posterior mold with a selected anterior mold to produce an ophthalmic lens having a criteria.

A third exemplary embodiment of the present disclosure provides a method of forming an ophthalmic lens. The method includes providing a plurality of posterior tools each having a posterior optic defining surface and a plurality of anterior tools having an anterior optic defining surface, wherein each one of the plurality of anterior tools has a different central anterior optic defining surface including a unique conic section. The method further includes selecting one of the plurality of posterior tools and one of the plurality of anterior tools based on a criteria, and forming a posterior mold by the selected one of the plurality of posterior tools and an anterior mold by the selected one of the plurality of anterior tools, the posterior mold and the anterior mold operable to form an ophthalmic lens having the criteria.

A fourth exemplary embodiment of the present disclosure provides a series of posterior tools having a posterior optic defining surface and a series of anterior tools having an anterior optic defining surface, wherein each one of the posterior tools has a different central posterior optic defining surface including a unique conic section, wherein a posterior tool is matable with a plurality of said anterior tools to form a posterior molds and anterior molds operable to mold ophthalmic lenses having different spherical power corrections but a consistent spherical aberration value.

The following will describe embodiments of the present disclosure, but it should be appreciated that the present disclosure is not limited to the described embodiments and various modifications of the invention are possible without departing from the basic principles. The scope of the present disclosure is therefore to be determined solely by the appended claims.

BRIEF DESCRIPTION OF THE SEVERAL VIEWS OF THE DRAWING(S)

FIG. 3 is an exemplary basic tooling matrix suitable for use in practicing exemplary embodiments of the present disclosure.

FIG. 4 is another exemplary tooling matrix with a posterior step suitable for use in practicing exemplary embodiments of the present disclosure.

FIG. 5 is an exemplary table for determining radii values for posterior step tools with varying conic suitable for use in practicing exemplary embodiments of the present disclosure.

Figure 8:
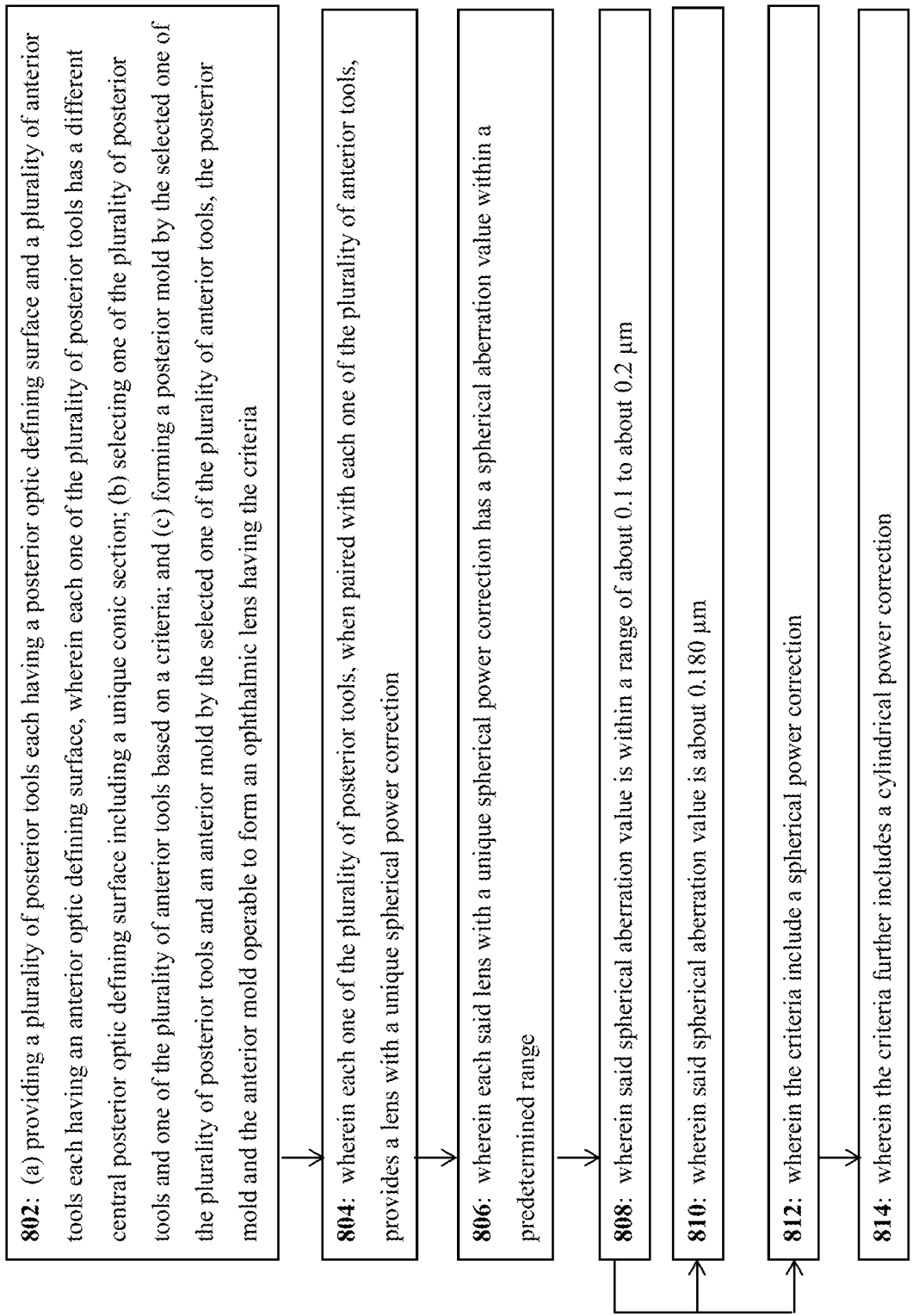

FIG. 8 presents an exemplary logic flow diagram in accordance with a method and apparatus for practicing exemplary embodiments of this disclosure.

DETAILED DESCRIPTION OF THE INVENTION

The optical power imparted by a contact lens is based on the relationship between the radii of the front surface (the anterior surface) and the on-eye or rear surface (the posterior surface). These two surfaces of a contact lens are formed by plastic molds produced from anterior and posterior optical tooling in a matrix combination. In other words, a collection of posterior and anterior mold halves that can produce a given contact lens having certain properties (e.g., power) can be represented by a matrix array with anterior molds on one axis and posterior molds on an adjacent axis. The combination of the mold halves produce a contact lens having specific properties.

Figure 1:
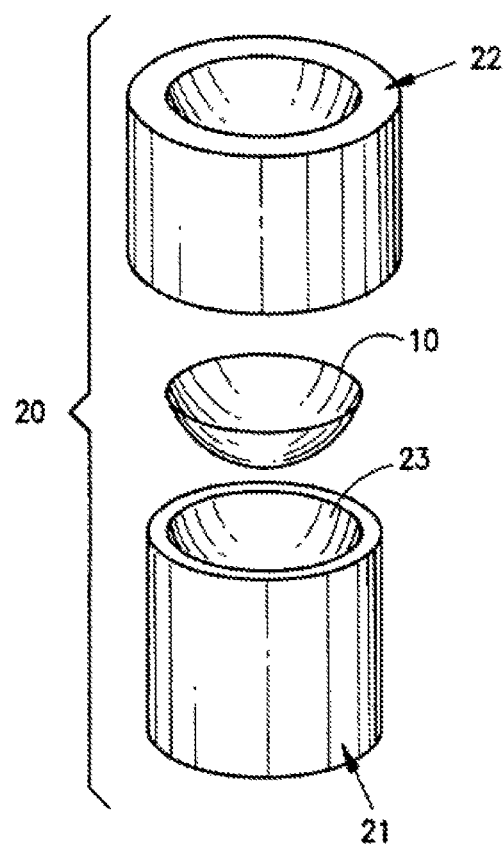
FIG. 1 is a perspective exploded view of an exemplary posterior and anterior mold assembly with a contact lens molded therein.

Referring to FIG. 1, shown is a perspective exploded view of a mold a posterior and anterior mold assembly with a contact lens molded therein. Shown in FIG. 1 is a posterior mold and anterior mold assembly 20. Assembly 20 includes an anterior mold 21 having an anterior optic defining surface 23, and posterior mold 22 having a posterior mold optic defining surface 24. Also shown in FIG. 1 is contact lens 10. Embodiments of contact lens 10 include an ophthalmic lens, such as a toric lens. In order to form contact lens 10, a curable liquid, which is preferably a polymerizable monomer mix, is introduced to the anterior mold optic defining surface 23. The two molds are brought into association with each other and the mix is at least partially cured forming contact lens 10.

Figure 2:
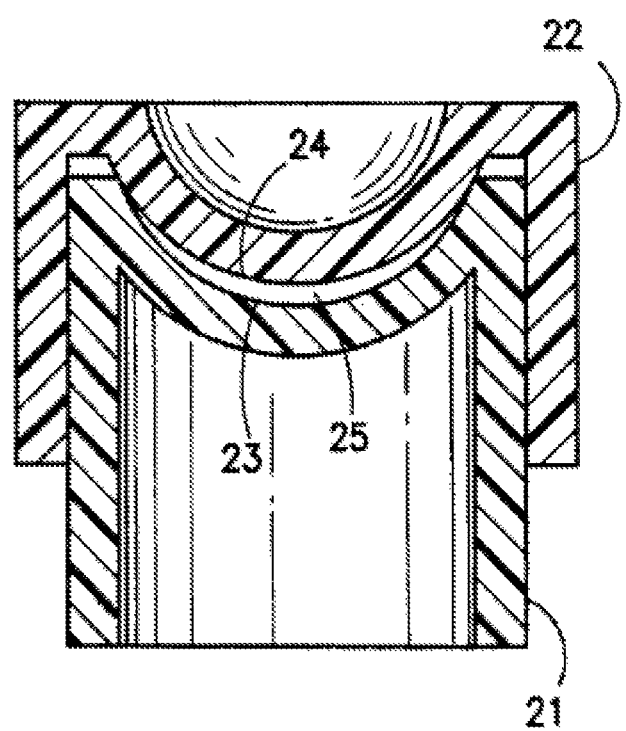
FIG. 2 is a cross-sectional view of the exemplary posterior and anterior mold assembly.

Referring now to FIG. 2, shown is a cross-sectional view of the exemplary posterior and anterior mold assembly. Shown in FIG. 2 is anterior mold 21 having an anterior optic defining surface 23, posterior mold 22 having posterior mold optic defining surface 24, and mold cavity 25. The posterior mold 22 and the anterior mold 21 have surface characteristics that are present on surface 23 and surface 24. These surface characteristics are transferred to the respective anterior and posterior surfaces of the molded contact lens and define the specifications of the resultant contact lens. Some of these surface characteristics include lens radius, shape, and conic. Accordingly, a given anterior mold 21 and posterior mold 22 are only operable to produce a lens with certain properties such as power. Thus, many different posterior and anterior molds are required in order to manufacture many different lenses with different characteristics.

The tooling to construct the many different posterior and anterior mold halves (including the optic defining surfaces of each mold) can be arranged in a matrix that allows a given posterior tool to be matched with a range of anterior tooling. For example, FIG. 3 illustrates an exemplary matrix with different anterior and posterior tools that can produce an array of molds and lenses with different optical characteristics. As shown in FIG. 3, the posterior tools are used to deliver lenses in 0.25 D increments (e.g., 1.00 D, −0.75 D, −0.50 D, 0.25 D) and are shown along the top x-axis of the matrix. The anterior tools can be spaced to deliver 1 diopter increments (e.g., −3D, −4 D, −5 D, etc.) and are located along the left y-axis of the matrix. The resultant lens powers are indicated at the intersection of a given posterior tool and a given anterior tool.

In order to provide greater manufacturing flexibility the difference between the posterior tools can be again further subdivided into step (or incremental) tools to provide a level of discrete control over the power of the lens that can be produced from resultant posterior and anterior molds from the tooling within the table or matrix. Reference is now made to FIG. 4, which illustrates a table with three additional posterior step tools on the top x-axis to the left and right of the −1.00 D tool. As shown in FIG. 4, there are three posterior step tools with a diopter less than −1.00 D and three posterior step tools with a diopter greater than the −1.00 D tool. These additional posterior step tools allow the system to produce resultant lenses that have powers in increments of 0.0625 D by selecting alternate posterior tools. Accordingly, as can be seen by a comparison between the table in FIG. 3 and FIG. 4, as a given matrix allows for finer adjustments between the resultant lens power, the complexity of the matrix increases. This in turn increases the number of posterior tooling required to make each lens.

One exemplary method utilized to effectively space out the step tooling increments to accommodate many different lens power requirements involves determining the distance in millimeters (mm) between the posterior radii equivalent to a 0.25 D differential in power. This is shown in FIG. 5. The subsequent step tools radii values are then determined by subdividing this figure into the required number of steps. However, one of the effects of this method is that the spherical aberration (SA) for each lens at a given power changes significantly across the steps and the process becomes unable to maintain a consistent SA. For instance, as shown in FIG. 5, if the anterior tool radius remains constant and the posterior tool radius is changed incrementally between 4.9898 mm and 5.0382 mm, the resultant spherical aberration will fluctuate between −0.172 μm and −0.186 μm.

Embodiments of the present disclosure reduce fluctuations in the spherical aberration between different posterior tools by varying the amount of conic on posterior tools. Embodiments also include varying the amount of conic on the posterior mold lens-molding surface while maintaining a constant amount of conic on the anterior lens-molding surface such that spherical aberration on a lens formed by the posterior and anterior molds is within a predetermined range. Embodiments further provide that the predetermined range is a variation in spherical aberration of less than 10%, preferably less than 5%, and most preferably less than 1%. Embodiments of the present disclosure provide that only specific steps can be used to create a given power in order to keep the SA value within a predetermined range. For instance, by varying the amount of conic on the posterior tools, two or more posterior tools with a different posterior tool radius could produce a lens with the same power, but with different SA values.

Exemplary embodiments of the present disclosure provide for incremental step tooling of the posterior tool structured around specific steps to limit the range of SA produced in the resultant lenses. Embodiments provide that the incremental steps cannot be used to produce lens powers outside of a given range in order to keep the SA close to a predetermined value. As a result, for the case that a given step is 0.25 D, each 0.25 D step will have its own corresponding set of step tools unique to that group. This can have the net effect of increasing the number of posterior tools required to produce a given set of lenses having powers within a certain range. This can become a significant number of tools, which are difficult to manage.

Embodiments of the present disclosure provide a matrix array with anterior tools spaced in 1 D increments, posterior tools in 0.25 D increments, and posterior step tools in 0.0625 D increments to achieve a desired lens power. Embodiments of the present disclosure also provide a method to maintain consistent spherical aberration (SA) levels in the resultant lens by optimizing or adjusting the conic constant of the posterior step tool or the anterior step tool. An exemplary benefit of aspects of the present disclosure is that any posterior step tool can be used with any given anterior tool and the resultant value of SA will be within predetermined limits or bounds.

One embodiment provides for setting or identifying the resolution of lens tooling by selecting a main step change of diopter power. This embodiment includes selecting a number of incremental steps to be determined within the main step change, calculating an incremental change of power for at least one incremental step, and varying a conic constant for the calculated incremental change in power to maintain the spherical aberration of the resultant lens within a predetermined range. In yet another embodiment, provided is a tooling set for forming mold halves for forming an ophthalmic device from a curable monomer mixture. The tooling set includes an anterior tool set having a plurality of anterior step tools, each anterior step tool having an optic defining surface, and the anterior tools configured to provide resultant diopter step increments. The step tool further includes a posterior tooling set having a plurality of posterior step tools and a plurality of incremental tools, each incremental tool having a unique conic constant, and wherein each incremental posterior step tool can be used with each anterior step tool to provide a resultant spherical aberration within a predetermined range.

Embodiments of the present disclosure further remove the necessity to band or group posterior tools, or to produce multiple posterior tools of effectively the same radii but with different levels of conic. Accordingly, an overlapping system with multiple similarly designed posterior tools can be replaced with a system that requires over 50% less posterior tools in the overall tooling matrix. This in turn can provide a significant cost and efficiency savings in manufacturing.

In one embodiment, the main 0.25 D steps can be subdivided into incremental units of diopters to obtain the desired lens characteristics rather than in mm of radius of the posterior mold. Embodiments provide that the change in power for each posterior mold includes subdividing each 0.25 D step into four 0.0625 D steps. Although four steps are discussed, it is understood the incremental steps could include 1, 10, or more. For example, if the −1.00 D posterior step tool is derived using an anterior radius of 8.8226 mm, a thickness of 0.1 mm, and a conic of −0.2033 in combination with a posterior radius 8.240 mm and 0.00 conic, the resultant lens will have a power of −3.08 and SA of −0.18 µm. The next step tool in the series can then be determined by adding 0.0625 D (the desired power incrementation) to −3.08 D to give −3.017 D. This value of −3.017 D then becomes the next target power with a subsequent re-optimization for SA. This process is then repeated for each required step tool. The results and proof of the effectiveness of this methodology are detailed in FIG. 6 and FIG. 7. Embodiments provide that the spherical aberration produced using this method in the resultant lenses can be within a range of 0.1 µm to 0.2 µm.

Figure 6:
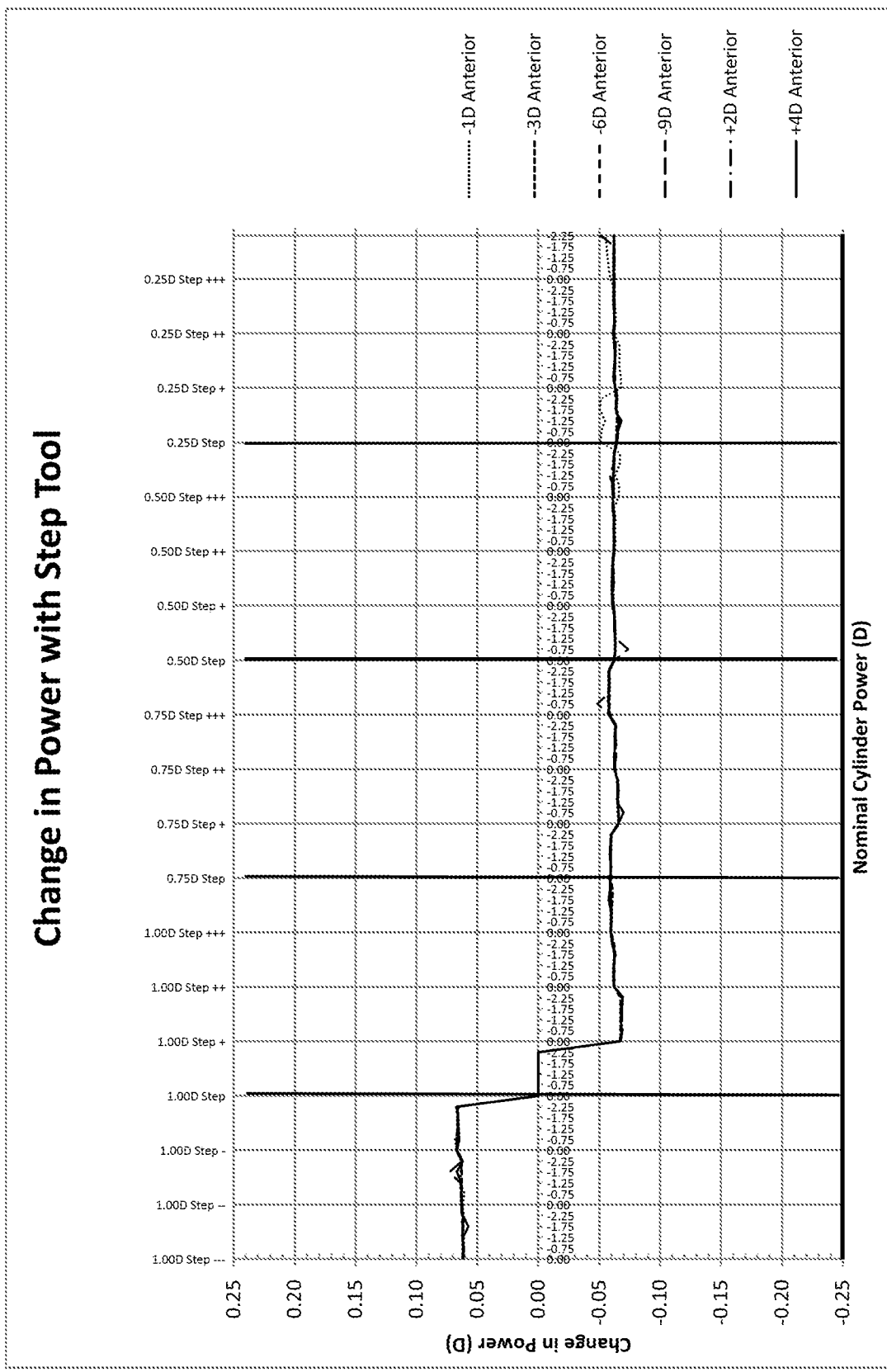
FIG. 6 is a graph illustrating the change in power with an exemplary step tool suitable for use in practicing exemplary embodiments of the present disclosure.

In FIG. 6, shown is a graph illustrating the change in power with an exemplary step tool in accordance with exemplary embodiments of the present disclosure. As shown in FIG. 6, the y-axis indicates the change in power (D) with markings in increments of 0.05. The top x-axis indicates the steps of the nominal cylinder power (D) for the posterior mold. In FIG. 6, the −1.00 D posterior step tool is used as an exemplary starting point at 0.00 D on the x-axis for all cylinders. For each subsequent posterior tool the change in power away from −1.00 D is shown. Plotted on the graph in FIG. 6 is an anterior mold with −1 D, −3D, −6 D, −9 D, +2D, and +4 D. As is evident, the data points are constant relative to the y-axis, indicating that a change of either +0.0625 or −0.0627 is consistently being delivered. The plot line remains constant for all anterior powers.

Figure 7:
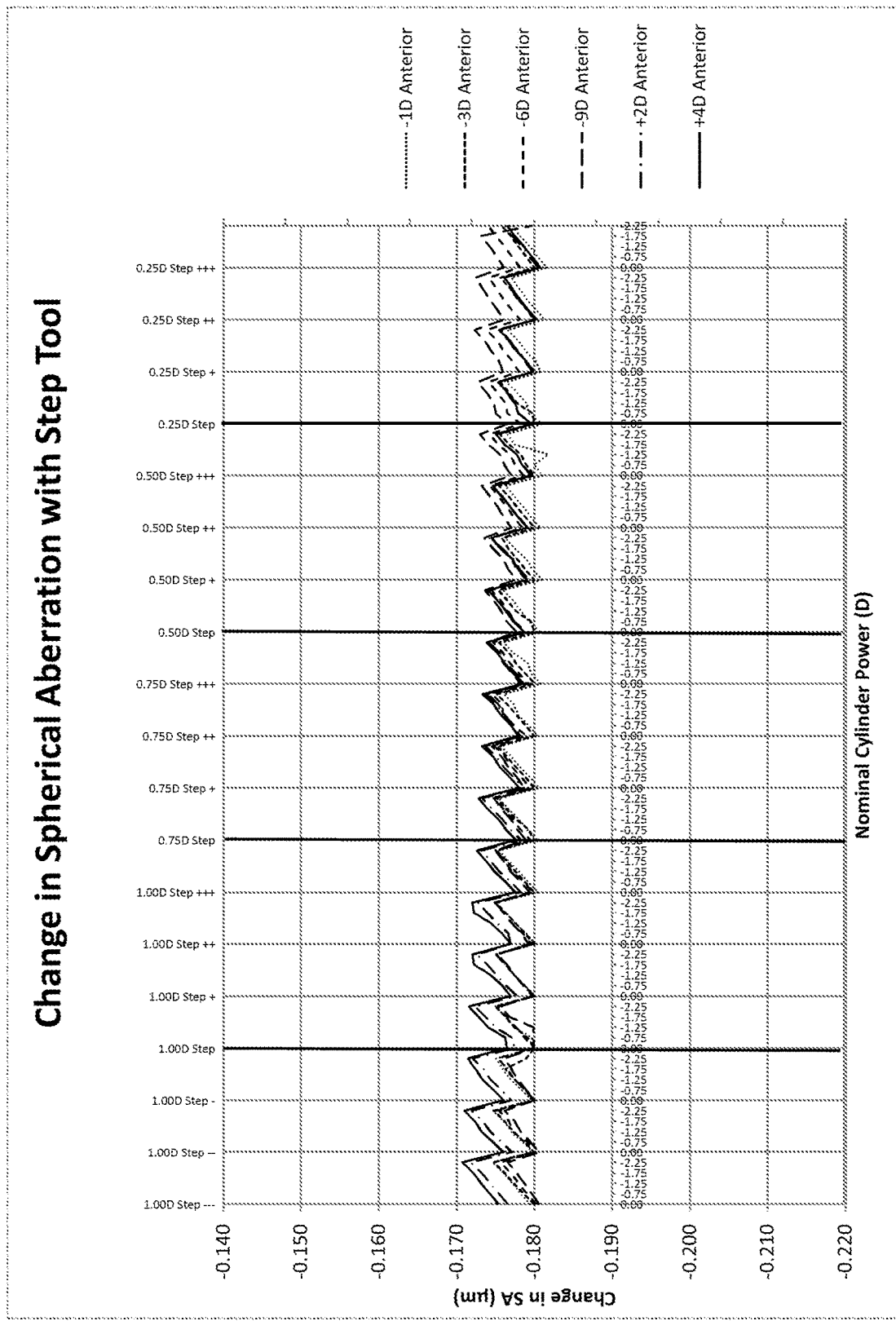
FIG. 7 is a graph illustrating the change in spherical aberration with an exemplary step tool suitable for use in practicing exemplary embodiments of the present disclosure.

Reference is now made to FIG. 7, which depicts a graph with spherical aberration values that correspond to the step tools used in FIG. 6. Shown in FIG. 7 along the y-axis is the change in spherical aberration in µm for the resultant lens. Along the x-axis is the nominal cylinder power of the posterior step tool. Plotted on the graph is the spherical aberration of a given resultant lens for an anterior mold having −1 D, −3D, −6 D, −9 D, +2D and +4 D. As is evident by the plot of the lines in FIG. 7, each step in the posterior tool along the x-axis for each anterior power has an absolute value of spherical aberration that is maintained within a saw tooth shaped band approximately between −0.180 µm and −0.170 µm. It should be appreciated that embodiments of the present disclosure provide that a spherical aberration target amount can be maintained within a saw tooth shaped band having a range of approximately 0.01 µm of the target amount.

Embodiments of the present disclosure provide that every posterior step tool has its own unique value for conic constant. The benefit of this approach is realized in the fact that any posterior step can be used with a given anterior tool and the resultant value of SA will be within a predetermined range. Embodiments remove the necessity to band or group posterior tools or to produce multiple posterior tools of effectively the same radii, but with different levels of conic.

Referring to FIG. 8, presented is an exemplary logic flow diagram in accordance with a method and apparatus for performing exemplary embodiments of this disclosure. Block 802 presents (a) providing a plurality of posterior tools each having a posterior optic defining surface and a plurality of anterior tools each having an anterior optic defining surface, wherein each one of the plurality of posterior tools has a different central posterior optic defining surface including a unique conic section; (b) selecting one of the plurality of posterior tools and one of the plurality of anterior tools based on a criteria; and (c) forming a posterior mold by the selected one of the plurality of posterior tools and an anterior mold by the selected one of the plurality of anterior tools, the posterior mold and the anterior mold operable to form an ophthalmic lens having the criteria. Then block 804 specifies wherein each one of the plurality of posterior tools, when paired with each one of the plurality of anterior tools, provides a lens with a unique spherical power correction.

Some of the non-limiting implementations detailed above are also summarized at FIG. 8 following block 804. Block 806 relates to wherein each said lens with a unique spherical power correction has a spherical aberration value within a predetermined range. Block 808 then states wherein said spherical aberration value is within a range of about 0.1 to about 0.2 μm. Block 810 indicates wherein said spherical aberration value is about 0.180 μm. Then block 812 states wherein the criteria include a spherical power correction. Finally, block 814 specifies wherein the criteria further includes a cylindrical power correction. The logic diagram of FIG. 8 may be considered to illustrate the operation of method, or the results of operation of an apparatus in accordance with exemplary embodiments of the present disclosure.

It is to be understood that any feature described in relation to any one embodiment may be used alone, or in combination with other features described, and may also be used alone, or in combination with one or more features of any other of the embodiments, or any combination of any other of the embodiments. The presently disclosed embodiments are therefore considered in all respects to be illustrative. Furthermore, equivalents and modifications not described above may also be employed without departing from the scope of this disclosure, which is defined in the accompanying claims.

The invention claimed is:

1. A method of forming an ophthalmic lens, the method comprising:
  (a) providing a plurality of posterior tools each having a posterior optic defining surface and a plurality of anterior tools each having an anterior optic defining surface, wherein the plurality of anterior tools and the plurality of posterior tools form a tooling set, wherein each one of the plurality of anterior tools has a different central anterior optic defining surface having an anterior conic constant, wherein each one of the plurality of posterior tools has a different central posterior optic defining surface including a unique conic constant which varies for each posterior tool, and wherein the central posterior optic defining surface of each posterior tool varies in increments which are subdivisions of 0.25 diopters;
  (b) selecting one of the plurality of posterior tools and one of the plurality of anterior tools based on a criteria, wherein the criteria includes a spherical power correction; and
  (c) forming a posterior mold by the selected one of the plurality of posterior tools and forming an anterior mold to be paired with the posterior mold by the selected one of the plurality of anterior tools, the posterior mold and the anterior mold operable to form an ophthalmic lens having a unique spherical power correction, wherein each ophthalmic lens includes a spherical aberration value within a predetermined range, and wherein the predetermined range is maintained by the unique conic constant which varies for each posterior tool used to form each posterior mold.

2. The method according to claim 1, wherein the spherical aberration value is within a range of about 0.1 to about 0.2 μm.

3. The method according to claim 2, wherein the spherical aberration value is about 0.180 μm.

4. The method according to claim 1, wherein the criteria further includes a cylindrical power correction.

5. The method according to claim 1, wherein the anterior optic defining surface of each anterior tool vary in 1.0 diopter increments and the posterior optic defining surface of each posterior tool vary in 0.0625 diopter increments.

6. A method of forming an ophthalmic lens, the method comprising:
  (a) providing a plurality of posterior tools each having a posterior optic defining surface and a plurality of anterior tools having an anterior optic defining surface, wherein the plurality of anterior tools and the plurality of posterior tools form a tooling set, wherein each one of the plurality of anterior tools has a different central anterior optic defining surface having an anterior conic constant, wherein each one of the plurality of anterior tools has a different central anterior optic defining surface including a unique conic constant which varies for each posterior tool, and wherein the central posterior optic defining surface of each posterior tool varies in increments which are subdivisions of 0.25 diopters;
  (b) selecting one of the plurality of posterior tools and one of the plurality of anterior tools based on a criteria, wherein the criteria includes a spherical power correction; and
  (c) forming a posterior mold by the selected one of the plurality of posterior tools and an anterior mold by the selected one of the plurality of anterior tools, the posterior mold and the anterior mold operable to form an ophthalmic lens having a unique spherical power correction, wherein each ophthalmic lens includes a spherical aberration value within a predetermined range, and wherein the predetermined range is maintained by the unique conic constant which varies for each posterior tool used to form each posterior mold.

7. The method according to claim 6, wherein the anterior optic defining surface of each anterior tool vary in 1.0 diopter increments and the posterior optic defining surface of each posterior tool vary in 0.0625 diopter increments.

* * * * *